US 7,797,854 B2

(12) United States Patent
Huettlin

(10) Patent No.: US 7,797,854 B2
(45) Date of Patent: Sep. 21, 2010

(54) APPARATUS FOR THE TREATMENT OF PARTICULATE MATERIAL

(76) Inventor: Herbert Huettlin, Ruemminger Strasse 15, D-79539 Loerrach (DE)

( * ) Notice: Subject to any disclaimer, the term of this patent is extended or adjusted under 35 U.S.C. 154(b) by 297 days.

(21) Appl. No.: 11/697,853

(22) Filed: Apr. 9, 2007

(65) Prior Publication Data
US 2007/0234586 A1    Oct. 11, 2007

Related U.S. Application Data

(63) Continuation of application No. PCT/EP2005/010299, filed on Sep. 23, 2005.

(30) Foreign Application Priority Data

Oct. 8, 2004   (WO) ............... PCT/EP2004/011232
Feb. 28, 2005  (DE) ................. 20 2005 003 791 U

(51) Int. Cl.
*F26B 21/06*    (2006.01)
*F26B 17/00*    (2006.01)
(52) U.S. Cl. .................. 34/73; 34/77; 34/78; 34/82
(58) Field of Classification Search ............ 34/567, 34/576, 585, 72, 73, 74, 76, 77, 78, 82
See application file for complete search history.

(56) References Cited

U.S. PATENT DOCUMENTS

| | | | | |
|---|---|---|---|---|
| 3,251,175 A | * | 5/1966 | Black, Jr. .................. | 55/294 |
| 3,288,129 A | * | 11/1966 | Fox ........................ | 126/19.5 |
| 4,145,818 A | | 3/1979 | Külling ..................... | 34/10 |
| 4,557,904 A | | 12/1985 | Brod et al. ................. | 422/146 |
| 4,656,056 A | | 4/1987 | Leuenberger .............. | 427/213 |
| 4,837,945 A | * | 6/1989 | Wulf et al. .................. | 34/77 |

(Continued)

FOREIGN PATENT DOCUMENTS

DE    2900342 A    *    6/1980

(Continued)

OTHER PUBLICATIONS

International Preliminary Report on Patentability, Jun. 7, 2007, 5 Pages.

(Continued)

*Primary Examiner*—Jiping Lu
(74) *Attorney, Agent, or Firm*—St. Onge Steward Johnston & Reens LLC

(57) ABSTRACT

An apparatus serves for the treatment of particulate material and comprises a process chamber for the reception and treatment of the particulate material. The process chamber has a bottom provided with a passage orifice through which the process air can be introduced into said process chamber and an outlet for the discharge of said process air from said process chamber. A device for conditioning said process air and for circulating said process air in a circuit through said process chamber said outlet and back to said bottom has at least one fan for circulating said process air at least one condenser and at least one process air heater. A filter arrangement is provided for removing solids from said process air flowing out of said process chamber. A second chamber is arranged around said process chamber within said second chamber at least parts of said filter arrangement at least parts of said device for conditioning the process air are received.

24 Claims, 6 Drawing Sheets

U.S. PATENT DOCUMENTS

| | | | | |
|---|---|---|---|---|
| 4,848,673 | A | * 7/1989 | Masuda et al. | 241/5 |
| 5,634,516 | A | 6/1997 | Myöhänen et al. | 165/104.16 |
| 5,866,737 | A | 2/1999 | Hagemeyer et al. | 585/443 |

FOREIGN PATENT DOCUMENTS

| | | |
|---|---|---|
| DE | 41 41 227 A1 | 6/1993 |
| DE | 199 04 147 A1 | 8/2000 |
| DE | 100 54 557 A1 | 5/2002 |
| DE | 101 27 240 A1 | 12/2002 |
| DE | 102 02 584 C1 | 3/2003 |
| DE | 102 32 863 A1 | 2/2004 |
| DE | 102 48 116 B3 | 4/2004 |
| EP | 0 103 940 | 3/1984 |
| EP | 0 282 777 | 9/1988 |
| GB | 2 003 396 | 3/1979 |
| JP | 61173011 A * | 8/1986 |
| WO | WO 02/100527 A1 | 12/2002 |
| WO | WO 2006/027009 | 3/2006 |

OTHER PUBLICATIONS

International Search Report, Nov. 30, 2005, 3 pages.

* cited by examiner

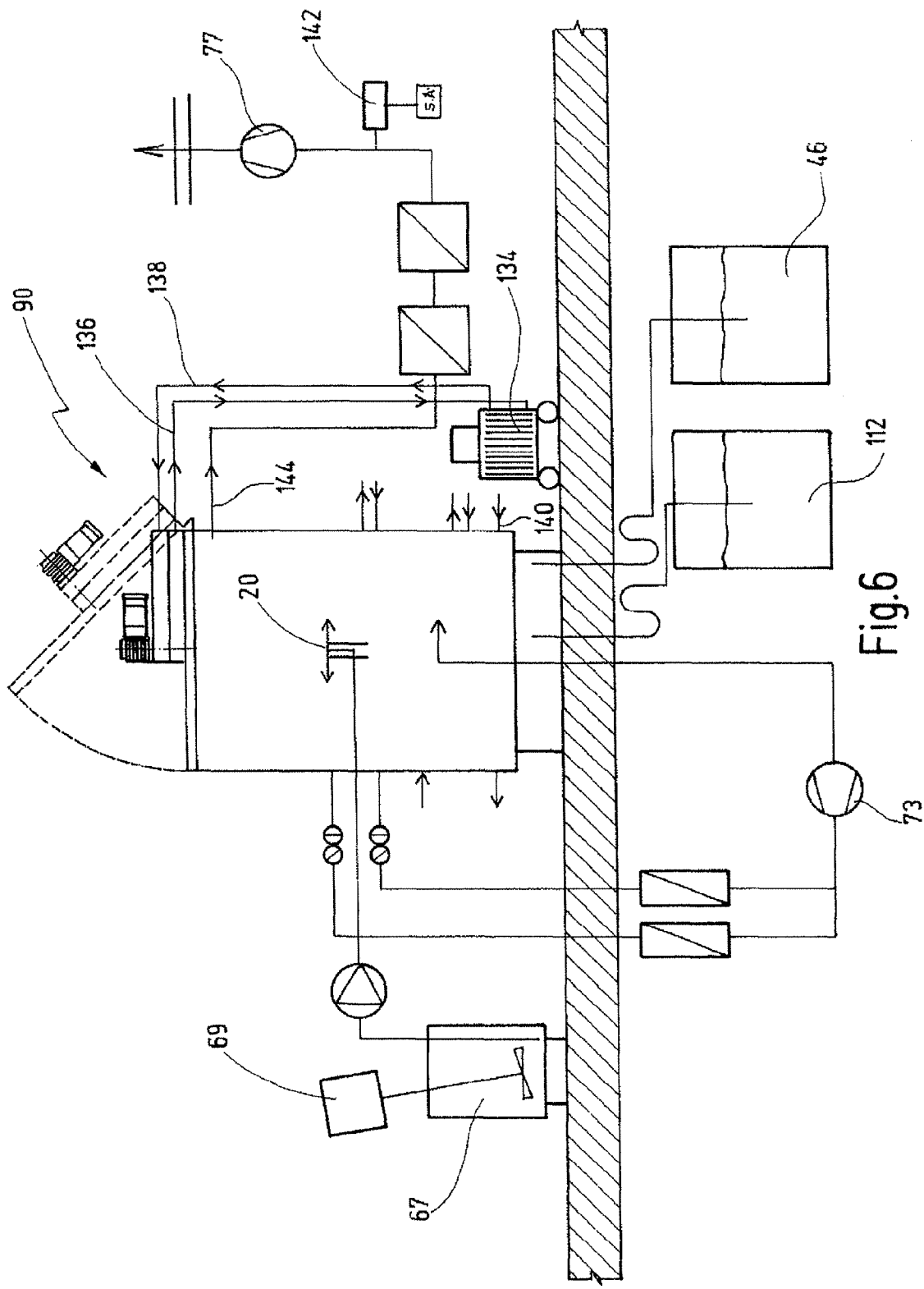

APPARATUS FOR THE TREATMENT OF PARTICULATE MATERIAL

CROSSREFERENCE OF PENDING APPLICATION

This application is a continuation of pending international application PCT/EP 2005/010299 filed on Sep. 23, 2005 which designates U.S. and which claims priorities of international application PCT/EP 2004/011232 filed Oct. 8, 2004 and German utility model application 20 2005 003 791.5 filed Feb. 28, 2005.

BACKGROUND OF THE INVENTION

The invention relates to an apparatus for the treatment of particulate material, with a process chamber for the reception and treatment of the material.

An apparatus of this type is known, for example, from DE 100 54 557 A1.

This apparatus is served, in particular for granulating or coating a particulate material. A gaseous medium, what is known as process air, is introduced into the process chamber via the bottom and at the same time flows, directed approximately horizontally, into the process chamber through the numerous orifices, mostly in the form of slots between mutually overlapping guide plates.

In this context, it became known to configure the bottom differently, as is known, for example, from DE 199 04 147 A1, DE 102 02 584 C1 or DE 102 48 116 B3. The material to be treated is swirled by the process air, the swirl characteristic being dependent in each case on the configuration of the bottom. If, for example, a certain circumferential component is also superposed on the process air, a toroidally revolving eddy flow ring is gradually formed.

If larger agglomerates are to be formed from dust-fine powder, say if the material is to be granulated, a tacky medium is supplied to the toroidal ring via nozzles. In DE 102 48 116 C1, for example, these are spray nozzles directed obliquely upward which are inserted in the wall of the container surrounding the process chamber. Where coating is concerned, a covering layer is to be applied, that is to say sprayed, as uniformly as possible onto an already existing larger body.

The material particles swirled by the process air fall down onto the floor again due to gravity, that is to say are separated from the process air which flows out of the process chamber to the upper outflow end via an outlet.

The process air is introduced via an inlet in an inflow chamber arranged below the bottom and then penetrates through the bottom into the process chamber through the numerous orifices.

After leaving the process chamber, if appropriate after flowing through filters arranged at the upper end of the process chamber, the process air is discharged from the apparatus and recycled.

In conventional apparatuses, separate monobloc units are provided, which are arranged in spaces away from the apparatus, mostly next to or above it, and are connected to the apparatus via pipeline systems.

In such instances, supply-air monobloc units are referred to, which are responsible for conditioning the process air, and exhaust-air monobloc units which ensure the environmentally correct disposal of the process exhaust air. The process air supplied is appropriately heated, brought to a specific drying/moisture content and moved into a degree of throughflow suitable for process management.

Depending on the type of treatment of the material, moisture, in particular solvents, must be extracted from the discharged process air.

The known type of interaction between the actual apparatus, that is to say the fluidized bed granulating and coating plant and the necessary supply-air monobloc and exhaust-air monobloc units requires a large amount of space and room. In this case, this often gives rise to long air paths via supply pipes and, as a result of this, to large inner surfaces which have to be cleaned or otherwise maintained from time to time.

Since such apparatuses are in widespread use in the pharmaceutical industry, these lines are produced from high-grade metallic materials which constitute a relatively large metallic mass which is an obstacle to a rapid variation of process air temperatures, since this large mass constitutes an inert system.

Air-routing pipelines can be properly inspected only rarely on their inner surface, and therefore the cleaning of these can be carried out only by means of technically complicated integrated cleaning systems. Cleaning in place or washing in place devices are referred to in this context.

Plant systems where there are gaps also require a relatively high outlay in terms of sound and heat insulation, thus resulting in considerable costs for setting up and operating an apparatus of this type.

U.S. Pat. No. 4,557,904 discloses a reactor for carrying out exothermal chemical reactions, in which a fluidizing medium is used in order to discharge the reaction heat, A cooler is arranged in the apparatus for cooling and absorbing the exothermal reaction heat.

EP 0 282 777 A discloses an apparatus for the combustion of carbon-containing material in a fluidized bed plant, in the process chamber of which is arranged a heat exchanger which serves for cooling and/or heating the gases.

DE 41 41 227 A1 discloses a fluidized bed reactor which is operated under pressure and around the central reaction space of which a plurality of groups of filters are arranged in order to filter out solids.

U.S. Pat. No. 4,145,818 discloses an apparatus for heating of granular material having a process chamber for fluidizing the granular material. Apart from the process chamber an air heater and a condenser are arranged.

The object of the present invention is to improve an apparatus of the type initially mentioned, to the effect that cost-effective process management is possible.

SUMMARY OF THE INVENTION

According to the invention this object is achieved by an apparatus for the treatment of particulate material comprising a process chamber for the reception and treatment of a particulate material, said process chamber having a bottom provided with passage orifices through which the process air can be introduced into said process chamber and an outlet for the discharge of said process air from said process chamber. A device for conditioning said process air and for circulating said process air in a circuit through said process chamber, said outlet and back to said bottom has at least one fan for circulating said process air, at least one condenser and at least one process air heater. A filter arrangement is provided for removal solids from said process air flowing out of said process chamber, said filter arrangement is arranged upstream of said device for conditioning said process air. A second chamber is arranged around said process chamber, within which second chamber at least parts of said filter arrangement and at least parts of said device for conditioning of said process air are received.

This measure, then, departs from the established principle of the monobloc type of construction present at a distance from the apparatus and ensures that essential treatments of the process air are carried out directly in the apparatus, i.e. within the second chamber arranged around the process chamber.

This compact type of construction in terms of an integration of the necessary structural elements into the apparatus results in a low space requirement. At the same time, lower masses of structural elements are necessary, this being equivalent to more rapid temperature change rates and regulating speeds.

The compact type of construction also leads to lower sound and heat emissions. There are fewer surfaces which come into contact with the process air, and therefore the surfaces to be cleaned are also substantially smaller. This results, overall, in lower costs for the plant as a whole and also in a lower energy requirement on account of substantially lower energy losses.

The process air flowing out from the process chamber mostly contains solvents of the treatment medium which is applied to the material in the process chamber, in particular water and organic solvents. Furthermore, it cannot be ruled out that, despite the presence of filters, gaseous or other very small liquid droplets are entrained by the process air and therefore constitute a pollutant of the process exhaust air. In the condenser, these constituents can be condensed out and separated from the process exhaust air.

Arranging the condenser in the second chamber of the apparatus thus dispenses with lines for supplying the pollutant-laden process air to units which lie apart and which contain the condenser.

Arranging the air heater in the second chamber of the apparatus makes it possible to heat the process air to process temperature immediately after the latter has left the condenser. Consequently, both the cooling operation for condensing out entrained pollutants and subsequent reheating to process temperature can be carried out beneficially in terms of the energy balance.

The advantage of providing the filter arrangement is that the process air is freed of entrained solid particles. The filter arrangement may consist of known dynamic filter systems which retain even the finest particles which are released periodically from the filter as a result of pressure pulses and are returned to the process chamber. These dynamic filter systems may be filter candles, filter cartridges or what are known as clown-collar filters which are arranged at the upper end region of the process chamber.

The advantage of providing the filter arrangement upstream of the conditioning device in terms of flow is that the process air is freed of entrained solid particles by means of the filter arrangement before this process air reaches the condenser. This rules out the possibility that the surface of the condenser is contaminated by these entrained solid particles, that is to say these are deposited on its surface.

The second chamber results in a highly compact type of construction which at the same time affords the possibility of gaining simple access to the components of the conditioning device from outside. This compact type of construction also permits appropriate sound and heat insulation measures in the simplest possible way.

Parts of the filter arrangement can likewise be arranged in the second chamber.

The advantage of this measure is that, despite the presence of a filter, a compact type of construction of the apparatus as a whole is obtained, and that, here too, the filter arrangements are accessible very easily, to be precise, for example, from outside.

In a further refinement of the invention, a fan for circulating the process air is arranged under the bottom.

The advantage of this measure is that the arrangement under the bottom constitutes a location at which such a fan can be accommodated beneficially, since such bottoms usually in any case have a circular outer contour.

In a further refinement of the invention, the fan is arranged, in terms of flow, between the condenser and the air heater.

The advantage of this measure is that the process air flowing to the fan is already freed of all pollutants and has to be routed by this fan only past the air heater and delivered to the bottom. This allows an especially effective control of the conditioning of the process air in terms of quantity and/or heat content.

In a further refinement of the invention, at least one nozzle is provided, by means of which a treatment medium for the material can be sprayed into the process chamber.

The result of this measure known per se is that the treatment medium can be introduced into the process chamber at a suitable location via the nozzles.

In a further refinement of the invention, spray air for spraying the treatment medium can be drawn off from the process air and supplied to the nozzle via a line.

This measure, then, has a considerable advantage that a gastight system closed off on itself can be provided. There arises in the system what is known as an air-quantity zero-sum cycle, in that that air quantity which is required for spraying the treatment medium through the nozzle is branched off from the process air and supplied to the nozzle. This allows an especially compact type of construction with an outwardly gastight routing both of the process air and of the spray air for the nozzle. Since the nozzle sprays into the process chamber, the gas quantities sprayed by the nozzle are intermingled with the process air and can be regenerated or conditioned together, that is to say, in particular, be freed of solvents or the like and then be supplied to the nozzle again as "pure spray air".

In a further refinement, a compressor for compressing the spray air is provided.

The advantage of this measure is that the control of the spray air pressure or of the spray air quantity can be controlled individually by means of this compressor. The compressor may likewise be an integral component of the apparatus, but may also be arranged outside, since the treatment medium must necessarily be fed with any substances from outside, in particular with the substance which is to he supplied to the material to be treated.

In a further refinement of the invention, the process chamber has an upright cylindrical wall which is closed off by means of the bottom, an air heater and a fan are arranged under the bottom, and annular filters and at least one following annular condenser are arranged in an annular space within the second chamber surrounding the wall.

In this special refinement, optimal adaptation of the conditioning device for the process air to the geometry of the process chamber takes place, thus resulting in an especially compact apparatus which has an efficient build and can therefore also be operated favorably.

In a further refinement of the invention, the process chamber has, at an upper outflow end, a cover which serves for deflecting the process air into the conditioning device.

The cover therefore not only serves as a termination and, if appropriate, also as an observation window for the actions taking place in the process chamber, but at the same time effects the deflection of the process air flowing out from the process chamber into the further regenerating or conditioning devices, such as filters, condensers, etc. received in the second chamber.

In a further refinement of the invention, a screen is arranged at the outflow end of the process chamber. In particular, it is advantageous to design this screen as a vibrating screen.

The advantage of this measure is that a separation of at least coarse solid particles from the outflowing process air is possible. On account of the design as a vibrating screen, the particles fall down again from the vibrating screen and back into the process chamber. These are therefore available again for treatment. The design as a large-area screen is conducive to the compact type of construction of the apparatus.

In a further refinement of the invention, a sucking device for the suction extraction of the solids retained by the filter arrangement is present.

The advantage of this measure is that the effectiveness of the filter arrangement is increased as a result of the suction extraction of solids which have been retained by the filters. In this case, where multistage filters are concerned, not all filters have to have suction extraction, but, instead, it is sufficient for that filter or those filters retaining the predominant and mostly coarser part of the solids to have suction extraction.

In a further refinement of the invention, the sucking device has a movable suction connection piece which sucks away the solids from filters of the filter arrangement from time to time.

The advantage of this measure is that the suction connection piece for suction extraction can be led up to the filters or over these, so that suction extraction can take place during operation.

In a further refinement of the invention, with filters which are arranged in the annular chamber arranged around the process chamber, the movable suction connection piece is designed as a rotating suction connection piece.

The advantage of this measure is that, by means of the rotating suction connection piece, solids can be sucked away from the filter arrangement continuously, but at the same time sufficient regions of the filters are always free for the actual filtering operation.

In a further refinement of the invention, the process air sucked away by the sucking device can be returned to the apparatus again after the suction-extracted solids have been separated.

The advantage of this measure is that the principle of the closed circuit routing is maintained in this refinement, too, in that the suction-extracted process air is returned again.

In a further refinement of the invention, a screen is arranged at the outflow end of the process chamber, and a device for blowing off material hanging on the screen is provided.

The screen which allows small particulate solids to pass through, which are subsequently retained by the abovementioned filters, retains larger particles of the material which are entrained by the process air.

These either are held on the underside of the screen by the process air flowing through the screen or adhere to the underside of the screen by being caught in the meshes of the screen or because the consistency is still tacky.

These parts of the material are consequently excluded from the further treatment process and, in order to achieve as uniform a treatment result as possible, must be returned to the process chamber again. This then takes place by means of this blow-off device.

In a further refinement of the invention, the blow-off device has a blowing shoe running over the screen.

The advantage of this measure is that the blowing shoe can blow parts of the screen free continuously, but at the same time sufficient regions of the screen are free to allow the process air to pass through, so that overall closed circuit routing is maintained in the apparatus.

In a further advantageous refinement of the invention, the device for the suction extraction of the filters and the device for blowing off the screen are combined in such a way that the process air sucked away by the suction extraction device can be supplied to the blow-off device.

The advantage of this measure, again, is that closed circuit routing is also carried out in this form of cleaning/blowing off, to be precise since the air quantity sucked away for the suction extraction of the filters is returned to the screen blow-off system again after the filtered-out solids have been separated.

In a further refinement of the invention, a radially extending rotated combined blowing/suction shoe is arranged above the process chamber.

The advantage of this measure is that the two devices for suction and blowing have a common structural element.

In a further refinement, the blowing/suction shoe has a suction orifice, which opens in the region of the filters, and, furthermore, has a blowing orifice which opens in the region of the screen.

The rotating blowing/suction shoe, via the suction orifice, thus sucks away the filters or the solids retained by these, and at the same time it blows the returned air through the screen and releases material which in this case adheres.

In a further refinement, a suction apparatus is provided which is connected to the blowing/suction shoe.

The advantage of this measure is that, for example, an available industrial vacuum cleaner can be assigned to the apparatus and sucks away the air, separates the entrained solid particles from this and then supplies the "exhaust air" to the blowing shoe again.

This is not only an extremely cost-effective refinement, since industrial vacuum cleaners of various types are available, but it allows a directed collection of the solids retained by the filters and then sucked away from these.

Depending on whether high-grade solids, for example in the pharmaceutical sector, are involved, these can be used again. If the substances are critical or hazardous to the environment, they can be discharged from the apparatus and collected in a directed way.

In a further refinement of the invention, the condenser has a first condenser for condensing out water and a second following condenser for condensing out solvents having a lower dew point than water.

Particularly in the pharmaceutical sector, in the treatment of the material in the process chamber, both aqueous solutions and solutions in organic solvents are processed. Owing to the two-state design, first the water and then those solvents which have a substantially lower dew point can be condensed out. This has the advantage not only that these two substances can be recovered separately due to two-stage condensation, but also that the situation is prevented where, for example, a condenser which is operated with extremely low-temperature coolant ices up due to water which has been condensed out.

In a further refinement of the invention, a connection for supplying of an inert gas is provided.

This measure has the considerable advantage that the inner space of the process chamber can be filled with such a protective gas, so that this plant can operate with explosion protection, for which purpose it is ensured that, for example, the oxygen concentration is kept below 6% by volume.

In a further refinement of the invention, a gas sensor for measuring the gas composition of the process air, in particular the oxygen content, is provided.

The advantage of this measure is that a continuous analysis of the gas composition of the process gas can take place by means of the gas sensor, so that the risk of explosions can be ruled out.

It will be appreciated that the features mentioned above and those yet to be explained below can be used not only in the combinations specified, but also in other combinations or alone, without departing from the scope of the present invention.

BRIEF DESCRIPTION OF THE DRAWING

The invention is described and explained in more detail by means of a selected exemplary embodiment, in conjunction with the accompanying drawings in which:

FIG. 6 shows a basic diagram, corresponding to FIG. 3, of a further embodiment of the apparatus.

DETAILED DESCRIPTION OF PREFERRED EMBODIMENTS

Figure 1:
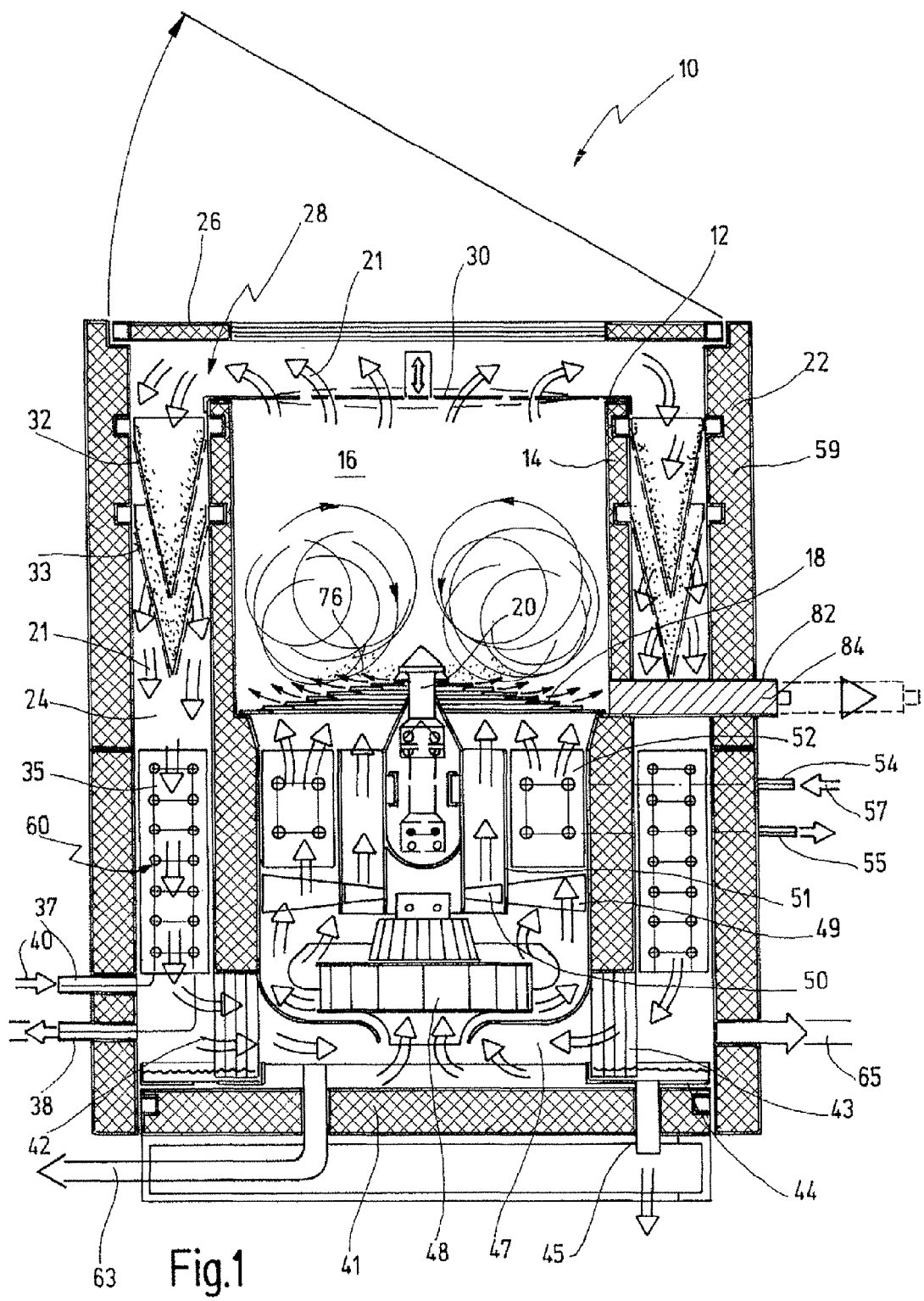
FIG. 1 shows a vertical section through an apparatus according to the invention with an integrated device for conditioning the process air and for the circulation of the latter.
Figure 2:
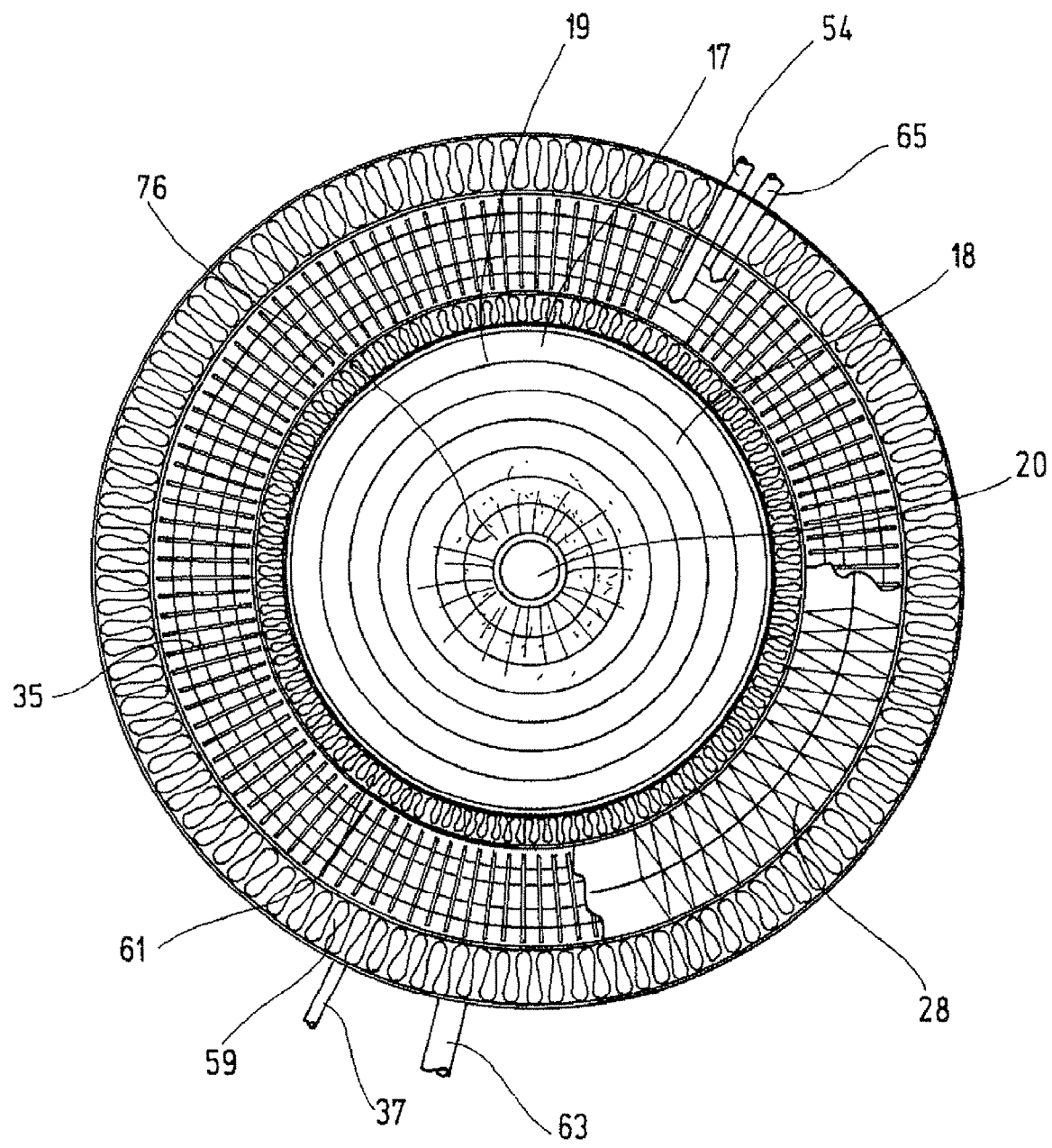
FIG. 2 shows a cross section through the apparatus of FIG. 1.
Figure 3:
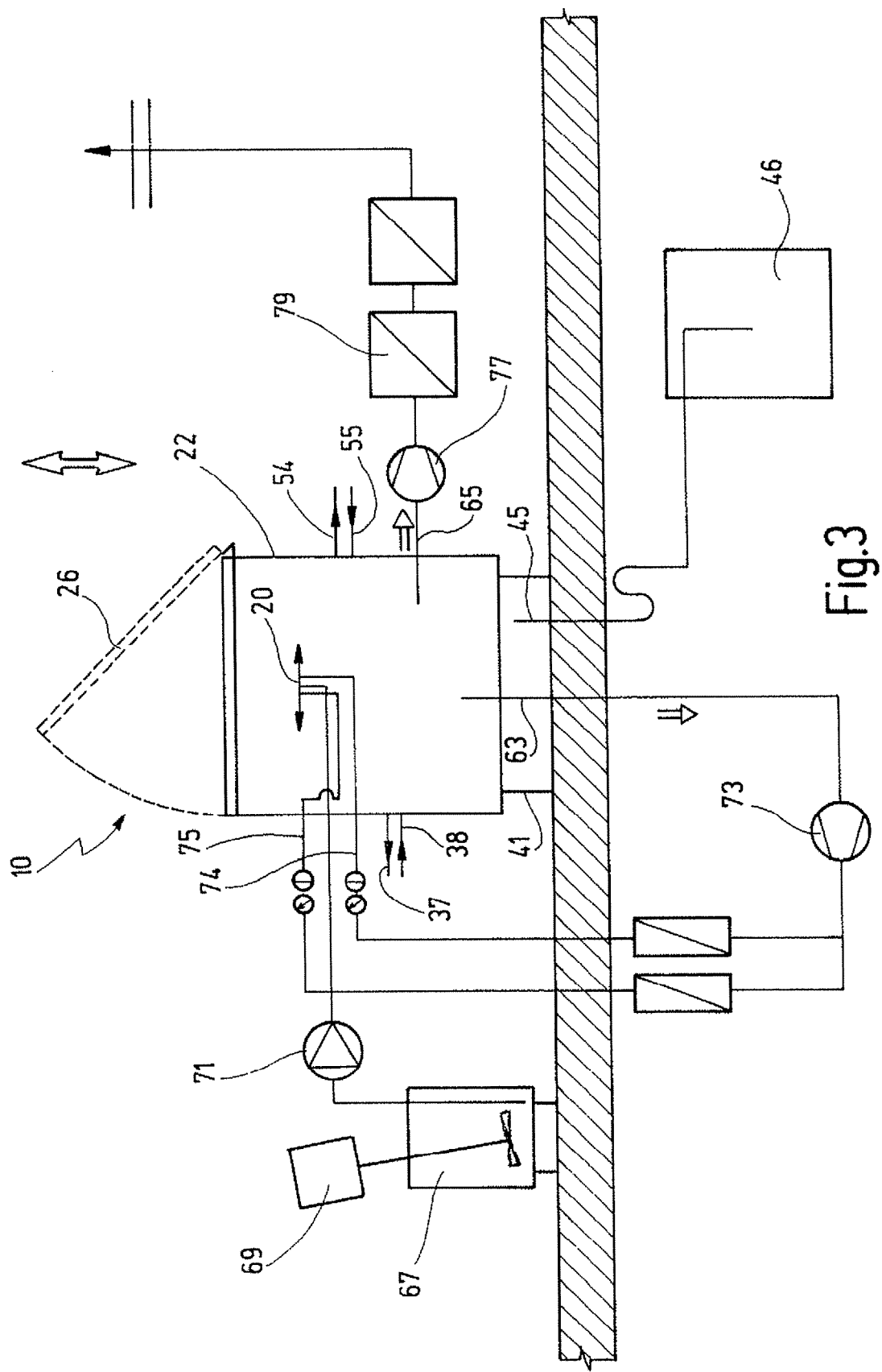
FIG. 3 shows highly diagrammatically a basic diagram of the apparatus according to the invention with some peripheral accessories for the feed of the nozzle.

An apparatus, illustrated in FIGS. 1 to 3, for the treatment of particulate material is designated in its entirety by the reference numeral 10.

As may be gathered particularly from the sectional illustration of FIG. 1, the apparatus 10 has a container 12 which has an inner upright hollow-cylindrical wall 14. The wall 14 delimits a first process chamber 16 which is closed off by means of a bottom 18.

The bottom 18 is composed of a series of seven annular metal sheets which are laid one above the other and partially overlap one another, so as to form between the annular metal sheets slots which constitute annular passage orifices through the bottom.

In the top view of FIG. 2, the reference numeral 17 designates representatively such an annular metal sheet and the reference numeral 19 a corresponding annular slot.

A nozzle 20, designed as an annular gap nozzle is received centrally in the bottom 18, the annular gap, not designated here, of the nozzle 20 running circumferentially, and the nozzle 20 therefore spraying out annularly in the plane of the bottom.

The more detailed configuration and the type of operation of such a bottom are described, for example, in DE 102 48 116 C1, to which express reference is made in this regard.

An atomizing nozzle of this type, with a spray angle of 180° and with a looping angle of 360°, is described, for example, in DE 102 32 863 A1, to which express reference is made here.

Furthermore, the combination of such a bottom with a spray nozzle of this type is described in the international patent application PCT/EP 2004/010096 of 10.09.2004.

The inner wall 14 is surrounded at a distance by an outer wall 22, with the result that a second annular chamber 24 is formed between the walls 14 and 22. The outer wall 22 projects somewhat above the wall 14 in height and is closed by means of a cover 26.

A filter arrangement 28 has a vibrating screen 30 which covers the upper end of the wall 14.

Two annularly continuous V-filters 32 and 33 of two different filter classes are arranged in the upper region of the second annular chamber 24.

The vibrating screen 30 serves as an exhaust air prefilter, the V-filter 32 as an exhaust air fine filter and the V-filter 33 lying beneath as an exhaust air ultrafine filter.

Below the filter arrangement 28 is arranged, in the second annular chamber 24, a two-stage condenser 35 which can be acted upon with a cooling medium 40 via connections 37, 38. Depending on the nature of the substances to be condensed out, for example water and solvent, such as acetone, isopropanol, ethanol, etc., cooling media 40 in the range of −40° C. to +5C are supplied via connections 37 and 38.

The inner wall 14 ends at a distance in front of a base 41 which constitutes the lower termination of the outer wall 22. An annular orifice 42 is consequently present. In the region of this orifice 42 is arranged a drop separator 43 which stands above a collecting trough 44 which is connected to an outlet 45 so that condensed-out liquids can be supplied to a collecting vessel 46 (see FIG. 3).

A fan 48, which acts as a radial blower, is arranged in a space 47 below the bottom 18 and within the wall 14. This high-performance centrifugal fan having a sucking action is operated via a hydraulic, pneumatic or electric drive. Centrally above the fan 48 stands the nozzle 20 which can be drawn off downward from the bottom 18 out of the apparatus 10. The approximately cylindrical body of the central nozzle 20, which extends beneath the bottom 18, is surrounded at a distance by a tube 51.

Around the tube 51 is arranged an air heater 52 which can be supplied with a heating medium 57 via connections 54, 55 to the outside. The heating media may be warm water, hot water or steam. Said air heater may also be operated with electrical energy. Flaps 50 are arranged in the space between the outside of the body of the nozzle 20 and the tube 51.

Further flaps 49 are arranged between the fan 48 and the air heater 52.

Depending on the position of the flaps, more or less process air, which is moved in the direction of the air heater 52 by the fan 58, is supplied directly to the air heater 52 or is supplied in the bypass between the air heater 52 and the body of the nozzle 20 to the underside of the bottom 18. A control, not illustrated in any more detail here, makes it possible to adjust the flaps correspondingly.

As is evident from the sectional illustrations, the walls 14, 22 are provided with an insulation 59 and an insulation 61, so that the condenser 35 is insulated thermally from the air heater 52, and vice versa.

The condenser 35 arranged in the second annular chamber 24, the fan 48 and the air heater 52 form parts of a device 60 for the conditioning of process air 21 and for circulating the process air 21 in a closed circuit.

In order to design a circuit system closed off on itself, some process air 21, after passing through the drop separators 43, is discharged from the apparatus 10 via a suction intake line 63, as is evident from FIG. 3.

The process air 21 drawn off by the suction intake line 63 is compressed by a compressor 73 and is supplied to the nozzle 20 again as spray air via two lines 74, 75. The treatment medium 76 to be sprayed by the nozzle 20 is prepared in a mixing container 67 with an agitator 69 and is supplied to the nozzle 20 via a pump 71.

As already mentioned above, the nozzle 20 is provided with an annular gap nozzle which sprays out the treatment medium, in interaction with the spray air, to form a planar spray cake running approximately horizontally at a distance above the uppermost guide plate of the bottom 20.

The arrangement of the annular metal sheets 17 arranged one above the other is such that the process air 21 emerges in a flow directed radially from the inside outward, is deflected upward from the inside of the wall 14 and entrains the material particles which are in this case to be treated and which subsequently then fall back again centrally onto the head of the nozzle 20, as illustrated in FIG. 1 by the corresponding movement arrows.

In the process chamber 16, therefore, the material particles to be treated are swirled by the process air 21 passing through the bottom 18, for example so as to form a toroidally rotating ring. The spray cake sprayed out in planar form subjects the material to be treated to extremely uniform treatment.

The process air 21 emerges from the process chamber 16 at the upper end of the latter and at the same time passes through the vibrating screen 30, with the result that coarse entrained solid parts are separated and, owing to its arrangement as a vibrating screen, are shaken off from this or from its underside again and are returned to the process chamber 16.

The process exhaust air 21 is deflected vertically downward from the underside of the cover 26 and is introduced uniformly into the second annular chamber 24. It flows from the top downward in the annular space and flows through the first V-filter 32 and the second V-filter 33, with the result that even the finest entrained solid particles are filtered out.

The process exhaust air subsequently runs through the two-stage condenser 35, by means of which both water and other solvents are condensed out. The condensate is collected in the bottom-side collecting trough 44.

The drop separators 43 ensure that fine entrained drops are also separated.

The process exhaust air 21 regenerated in this way then flows into the space 47 and is freed of any impurities, whether they be solids or liquid particles. Part is sucked in via the suction intake line 63 and, as described above, is supplied as spray air to the nozzle 20 via the compressor 33.

The process air 21 is supplied to the air heater 52 via the fan 48, a corresponding heat content being transferred to the process air 21.

Depending on the position of the flaps 49, 50, more or less process air 21 is routed directly via the air heater 52.

The then heated process air is supplied to the underside of the bottom 18, passes through the slots 19 in the bottom and forms an initially approximately horizontally oriented air cushion, on which the toroidally moved highly fluidized ring of swirled material particles is located.

It is evident from FIG. 1 and FIG. 3 that, via a connection 65 connected to a fan 77 which is followed by activated charcoal filters 79, a certain vacuum of about 100 Pa can be maintained permanently in the system.

In the system itself, there is what is known as an air-quantity zero-sum cycle, that is to say the process air drawn off from the inner closed circuit via the suction intake line 63 is supplied again as spray air by the nozzle, so that no process air quantities leave the apparatus or have to be supplied to the latter from outside. Since a certain vacuum is to be maintained in such systems with respect to the outside, there is the fan 77, designated as a snifting fan, which is capable of generating the system vacuum of 100 Pa and at the same time of overcoming the packing of the activated charcoal filter 70 or its resistance.

In practice, the system is completely gastight, the snifting fan 77 always operating counter to the vacuum, but not conveying any air quantity because there is no leakage.

The filling of the process chamber 16 with the material to be treated can take place from above, with the cover 26 open and the vibrating screen 30 lifted off.

The emptying of the treated material takes place radially or tangentially via a connection piece 82 which has a radially or tangentially arranged plug 84 which can be drawn out or reinserted manually or in a mechanized/automated manner. The product moved radially and tangentially over the bottom 18 by the process air 21 and consisting of treated material particles finds its way automatically to the emptying connection piece 82 into a corresponding reception vessel, not illustrated in any more detail here.

The arrangement illustrated also makes it possible very simply to clean the entire inner space of the system.

It is possible to flood the entire inner space with a scavenging/cleaning liquid and to circulate this by means of the in this case relatively slow movement of the fan 48, that is to say to achieve virtually a kind of washing machine effect.

For simple access to the parts of the device 60 which are received in the second annular chamber 24, it is possible to raise the entire outer wall 22 or to design this outer wall 22 as segmentally movable swing-up doors.

Figure 4:
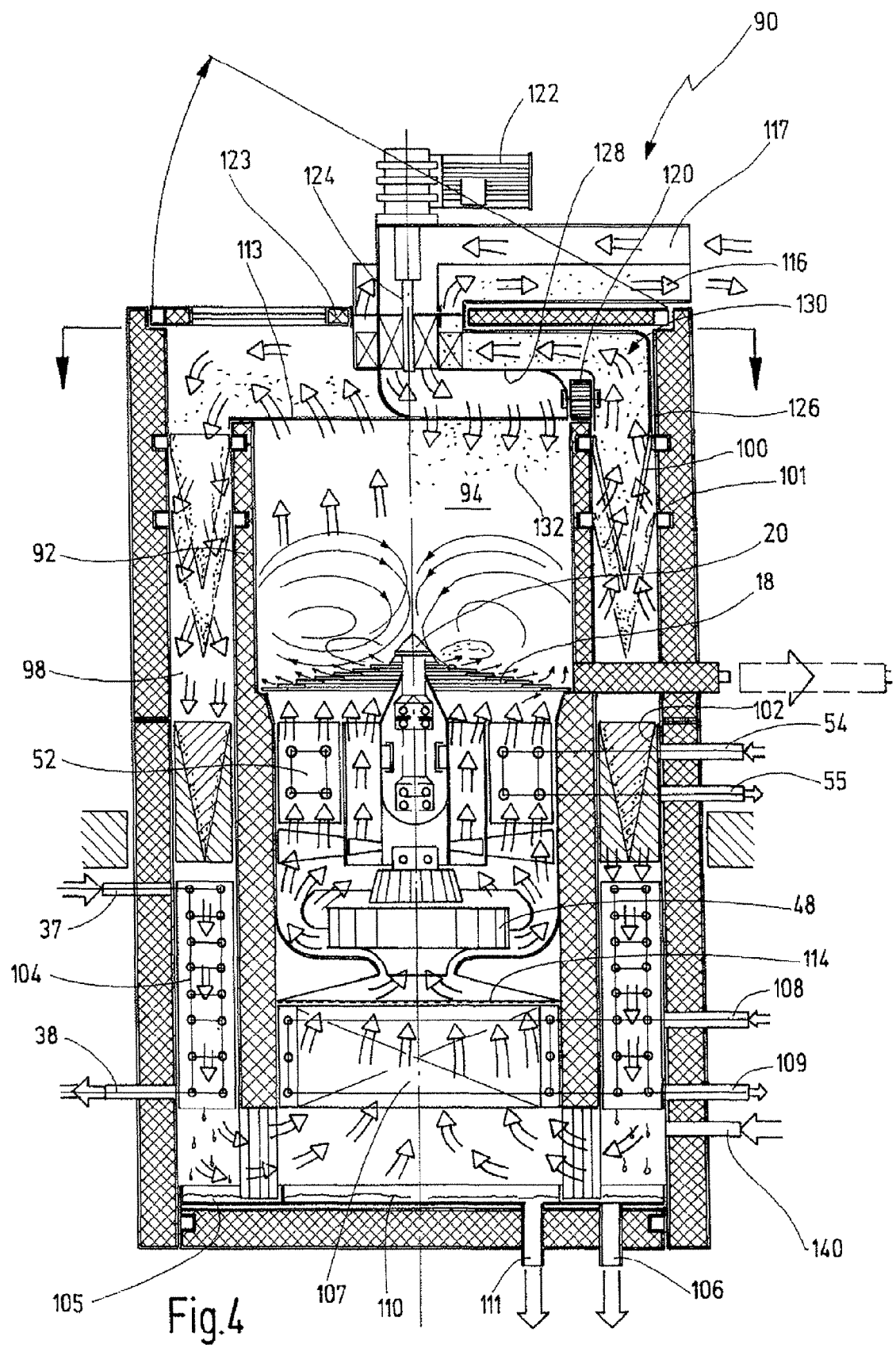
FIG. 4 shows a vertical section, comparable to FIG. 1, through a further embodiment of an apparatus according to the invention.
Figure 5:
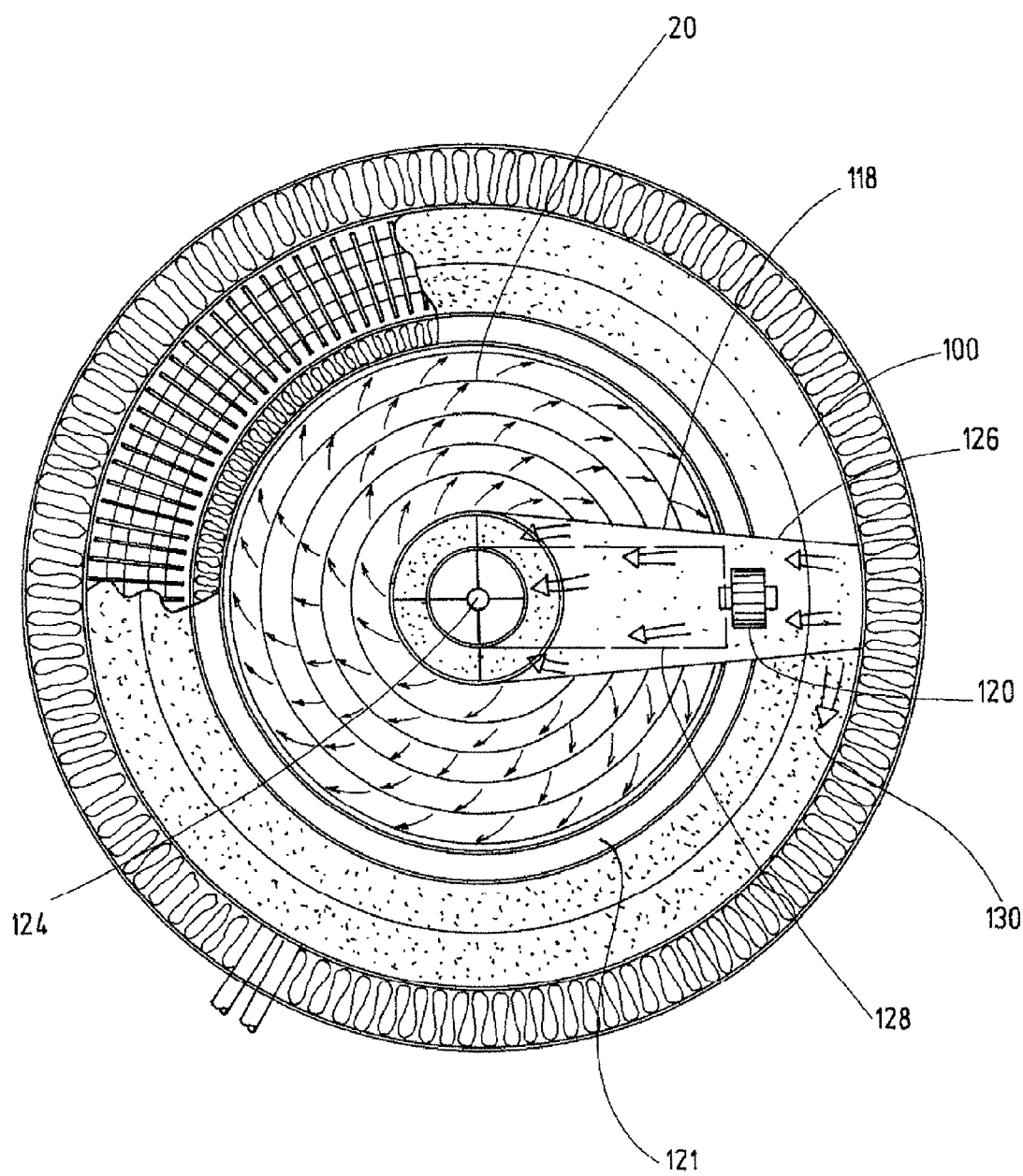
FIG. 5 shows a section, comparable to the section of FIG. 2, through the apparatus of FIG. 4.

FIGS. 4 to 6 illustrate a further embodiment of an apparatus according to the invention which is designated as a whole by the reference numeral 90.

The apparatus 90 is constructed identically in numerous structural elements to the apparatus described in FIGS. 1 to 3, and therefore components which are identical per se are also given the same reference numerals.

As described above, the apparatus 90 has an upright hollow-cylindrical container 92 which surrounds a process chamber 94.

The process chamber 94 has a bottom 96 which is designed identically to the bottom 18 described above, in which is received centrally a corresponding nozzle 20 which carries the fan 48 on its underside. An air heater 52 with its connections 54 and 55 is also provided correspondingly.

In the apparatus 90, too, the process chamber 94 is surrounded by an second annular chamber 98, in which corresponding components of the device for conditioning the process air are arranged.

It is therefore clear that, here too, two annular V-filters 100 and 101 are arranged at the upper inflow-side end of the annular space 98.

In contrast with the apparatus 10, a third V-filter 102 is also arranged downstream of the second V-filter 101 in terms of flow.

This third V-filter 102 serves as a third static filter stage, as what is known as S-filter class, that is to say as a submicron particulate filter.

Furthermore, in contrast with the apparatus 10 shown in FIG. 1, the condenser 35 is designed as a two-part condenser.

For this purpose, an annular first condenser 104 is provided, downstream of the third V-filter 102 in terms of flow, in the annular space 98 and serves for condensing water out of the process air. Via the corresponding connections 37 and 38, either cold water, for example at 6°/12° C., or a brine at −5°/0° C. is respectively supplied and discharged again. The water condensed out by the first condenser 104 is collected via an annular collecting trough 105 and is supplied to a collecting vessel 46 via an outlet 106, as already described in connection with FIG. 3.

A second condenser 107 is arranged at the lower end of the container 92 and is supplied via corresponding connections 108, 109 with a cooling medium, for example a low-temperature refrigerant (~−20° C.), such as, for example, dichlorodifluoromethane.

This second condenser 107 serves for condensing out liquids having a lower dew point than water, that is to say, for example, organic solvents. The condensate condensed out by the second condenser 107 is collected in a bottom-side collecting trough 110 and supplied to a second collecting vessel 112 via an outlet 111, as is evident from FIG. 6. A perforated plate 114, which functions as a flow straightener, is arranged above the second condenser 107, so that a relatively straightened flow is then supplied via the fan 48 to the underside of the bottom 96 via the air heater 52.

A device 116 for the suction extraction of process air and a device 117 for blowing in process air are arranged in the cover 123 of the apparatus 90. These two devices 116, 117 are combined in such a way that they have a common suction/blowing shoe 118, as is also evident particularly from FIG. 5.

The suction/blowing shoe 118 rests via a running roller 120 on the top edge 121 of the container 92. A central drive 122 likewise received in the cover 123 ensures that the suction/blowing shoe 118 rotates, specifically about the central vertical longitudinal mid-axis of the apparatus 90, that is to say about the longitudinal axis of the drive shaft 124, as is evident from FIGS. 4 and 5.

It is clear from FIG. 5 that the suction/blowing shoe 118 rotates clockwise, for example at a rotational speed of 5 to 10 rev/min. The upper end of the process chamber or the container 92 is closed off by means of a static screen 113.

It is clear from the sectional drawing of FIG. 4 that the suction/blowing shoe 118 has a suction connection piece 126, the orifice of which opens directly above the V-filter 100. A corresponding blowing shoe 128 is designed such that its blow-out orifice issues directly above the screen 113.

It is clear from the top view of FIG. 5 that this suction/blowing shoe 118 extends approximately radially and at the same time over a certain circumferential portion of the uppermost V-filter 100. The filters 100 and 101 are suction-extracted by means of the suction connection piece. At the same time, the radially further inward region of the screen 113 is blown off.

As is evident from FIG. 6, the combined device for suction and blowing is connected via corresponding lines 136, 137 to a sucking apparatus 134 in the form of an industrial vacuum cleaner.

In other words, the sucking apparatus 134 suction-extracts the filters 100 and 101 via the suction connection piece 126, that is to say the solids 130 retained by these are entrained, supplied to the sucking apparatus 134 and filtered out there, and the "exhaust air" is returned to the blowing shoe 128, and, by means of the latter, material 132 adhering to the underside of the screen 113 is fed again into the process chamber 94 or into the material particles which swirl around above the bottom 96 and are to be treated. This can thus be carried out in closed circuit.

It is evident from FIG. 4 that an inert gas connection 140 is provided, via which the inner space can be acted upon or can be scavenged with inert gas.

In the system, described above in connection with FIG. 3, for maintaining a vacuum by means of the snifting fan 77, a gas sensor 142 is additionally integrated, which is connected to the process air via the line 144. By means of this gas sensor 142, the respective gas composition can be analyzed, particularly as to whether an explosive mixture is present, which is not the case when the oxygen concentration is kept below 6% by volume. Corresponding control measures may then also be provided so as not to overshoot such an oxygen threshold value.

The invention claimed is:

1. An apparatus for the treatment of particulate material, comprising a first process chamber of circular cross-section for the reception and treatment of a particulate material, said process chamber having:
    a bottom provided with passage orifices through which a process air can be introduced into said process chamber, and
    an outlet for the discharge of said process air from said process chamber,
    a device for conditioning said process air and for circulating said process air in a circuit through said process chamber, said outlet and back to said bottom, said device having
    at least one fan for circulating said process air,
    at least one annular condenser, and
    at least one process air heater, wherein
    a filter arrangement is provided for removing solids from said process air flowing out of said process chamber, said filter arrangement is arranged upstream of said device for conditioning said process air, and wherein
    a second annular chamber is provided which entirely surrounds said first circular process chamber,
    wherein said at least one fan and said at least one process air heater are arranged below said bottom of said process chamber, and wherein an annular filter of said filter arrangement and said at least one annular condenser are arranged in said second annular chamber surrounding said process chamber.

2. The apparatus of claim 1, wherein said fan is arranged between said condenser and said air heater.

3. The apparatus of claim 1, wherein at least one nozzle is provided by means of which a treatment medium for treating said particulate material can be sprayed into said process chamber.

4. The apparatus of claim 3, wherein a spray air for spraying said treatment medium can be drawn off via a bypass from said process air and supplied to said nozzle via a line.

5. The apparatus of claim 4, wherein a compressor for compressing said spray air is provided.

6. The apparatus of claim 1, wherein said process chamber has an upright cylindrical wall which is closed off by means of said bottom.

7. The apparatus of claim 1, wherein at an upper outflow end of said process chamber a cover is provided, which serves for deflecting said process air into said device for conditioning said process air.

8. The apparatus of claim 7, wherein a screen is arranged at said outflow end of said process chamber.

9. The apparatus of claim 8, wherein said screen is designed as a vibrating screen.

10. The apparatus of claim 1, wherein a sucking device is provided for extracting solids retained by said filter arrangement.

11. The apparatus of claim 10, wherein said sucking device has a movable suction connection piece which sucks away said solids from said filters of said filter arrangement from time to time.

12. The apparatus of claim 11, wherein filters of said filter arrangement are arranged in said second chamber surrounding said process chamber, and said movable suction connection piece is designed as a rotating suction connecting piece rotating about said filters.

13. The apparatus of claim 10, wherein process air sucked away by said sucking device can be returned to said apparatus again after said solids extracted have been separated.

14. The apparatus of claim 10, wherein said sucking device is combined with a blowing device for blowing off a screen arranged at an outflow of said process chamber, and wherein process air sucked away by said suction device can be supplied to the blowing device.

15. The apparatus of claim 14, wherein a radial extending rotating combined blowing and suction shoe is arranged above said process chamber.

16. The apparatus of claim 15, wherein said combined blowing and suction shoe has a suction orifice opening in an area of said filters and furthermore has a blowing orifice opening in an area of said screen.

17. The apparatus of claim 16, wherein a suction apparatus is provided which is connected to said combined blowing and suction shoe.

18. The apparatus of claim 1, wherein a screen is arranged at an outflow of said process chamber and a blowing device for blowing off material retained by said screen is provided.

19. The apparatus of claim 18, wherein said blowing device is designed movably in order from time to time to blow off material adhering on said screen.

20. The apparatus of claim 19, wherein said blowing device has a blowing shoe running over said screen.

21. The apparatus of claim 1, wherein said condenser has a first condenser for condensing out water and a second following condenser for condensing out solvents having a lower dew point than water.

22. The apparatus of claim 1, wherein a connection for supplying an inert gas is provided.

23. The apparatus of claim 1, wherein a gas sensor for measuring a gas composition in said apparatus is provided.

24. The apparatus of claim 1, wherein an oxygen sensor for measuring oxygen content is provided.

* * * * *